United States Patent
Wieczorek

(10) Patent No.: US 7,608,836 B2
(45) Date of Patent: Oct. 27, 2009

(54) X-RAY DETECTOR WITH CSI:T1 CONVERSION LAYER

(75) Inventor: Herfried Karl Wieczorek, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 164 days.

(21) Appl. No.: 10/516,137

(22) PCT Filed: May 16, 2003

(86) PCT No.: PCT/IB03/02046

§ 371 (c)(1),
(2), (4) Date: Nov. 29, 2004

(87) PCT Pub. No.: WO03/100460

PCT Pub. Date: Dec. 4, 2003

(65) Prior Publication Data

US 2005/0199819 A1    Sep. 15, 2005

(30) Foreign Application Priority Data

May 29, 2002 (EP) .................. 02077108

(51) Int. Cl.
G01T 1/24 (2006.01)
(52) U.S. Cl. .................. 250/370.11
(58) Field of Classification Search ............. 250/370.11
See application file for complete search history.

(56) References Cited

U.S. PATENT DOCUMENTS

| | | | |
|---|---|---|---|
| 3,275,827 A | * | 9/1966 | Lind .................. 250/369 |
| 3,825,763 A | * | 7/1974 | Ligtenberg et al. ....... 250/486.1 |
| 4,101,781 A | | 7/1978 | Neukermans et al. |
| 4,277,303 A | * | 7/1981 | Swinehart .................. 117/76 |
| 4,313,257 A | * | 2/1982 | Woodbury et al. .......... 29/592.1 |
| 4,535,243 A | * | 8/1985 | Peschmann ............ 250/363.02 |
| 4,720,426 A | * | 1/1988 | Englert et al. ............... 428/344 |
| 5,153,438 A | * | 10/1992 | Kingsley et al. ....... 250/370.09 |
| 5,398,275 A | * | 3/1995 | Catalin ...................... 378/98.8 |
| 5,418,833 A | * | 5/1995 | Logan ........................ 378/154 |
| 5,434,418 A | | 7/1995 | Schick |
| 5,548,123 A | | 8/1996 | Perez-Mendez et al. |
| 5,596,198 A | | 1/1997 | Perez-Mendez |
| 5,876,630 A | | 3/1999 | Vinograd et al. |

FOREIGN PATENT DOCUMENTS

EP    1091216 A1 *  4/2001
JP    08-295878      12/1996

OTHER PUBLICATIONS

Jing, T., et al.; Amorphous Silicon Pixel Layers with Cesium Iodide Converters for Medical Radiography; IEEE Trans on Nuc. Science; 1994, vol. 41, No. 4, pp. 903-909.
Panova, et al.; Study of the Growth Atmosphere Effect on Optical and Scintillation Characteristics of Large CsI(Tl) Crystals; J. of Crystal Growth; 1999, vol. 198-199, pp. 865-868.

* cited by examiner

*Primary Examiner*—David P Porta
*Assistant Examiner*—Shun Lee

(57) ABSTRACT

An x-ray detector comprises a conversion layer for converting x-radiation into optical radiation. Photosensitive elements notably photodiodes to derive electronic signals from the optical radiation received by the photosensitive elements. The conversion layer contains Caesium-iodide doped with Thallium (CsI:Tl); the Caesium-iodide doped with Thallium is ultrapure and the Tl-doping level is in the range of 0.25-1.00 at %.

21 Claims, 5 Drawing Sheets

X-RAY DETECTOR WITH CSI:Tl CONVERSION LAYER

Figure 1:
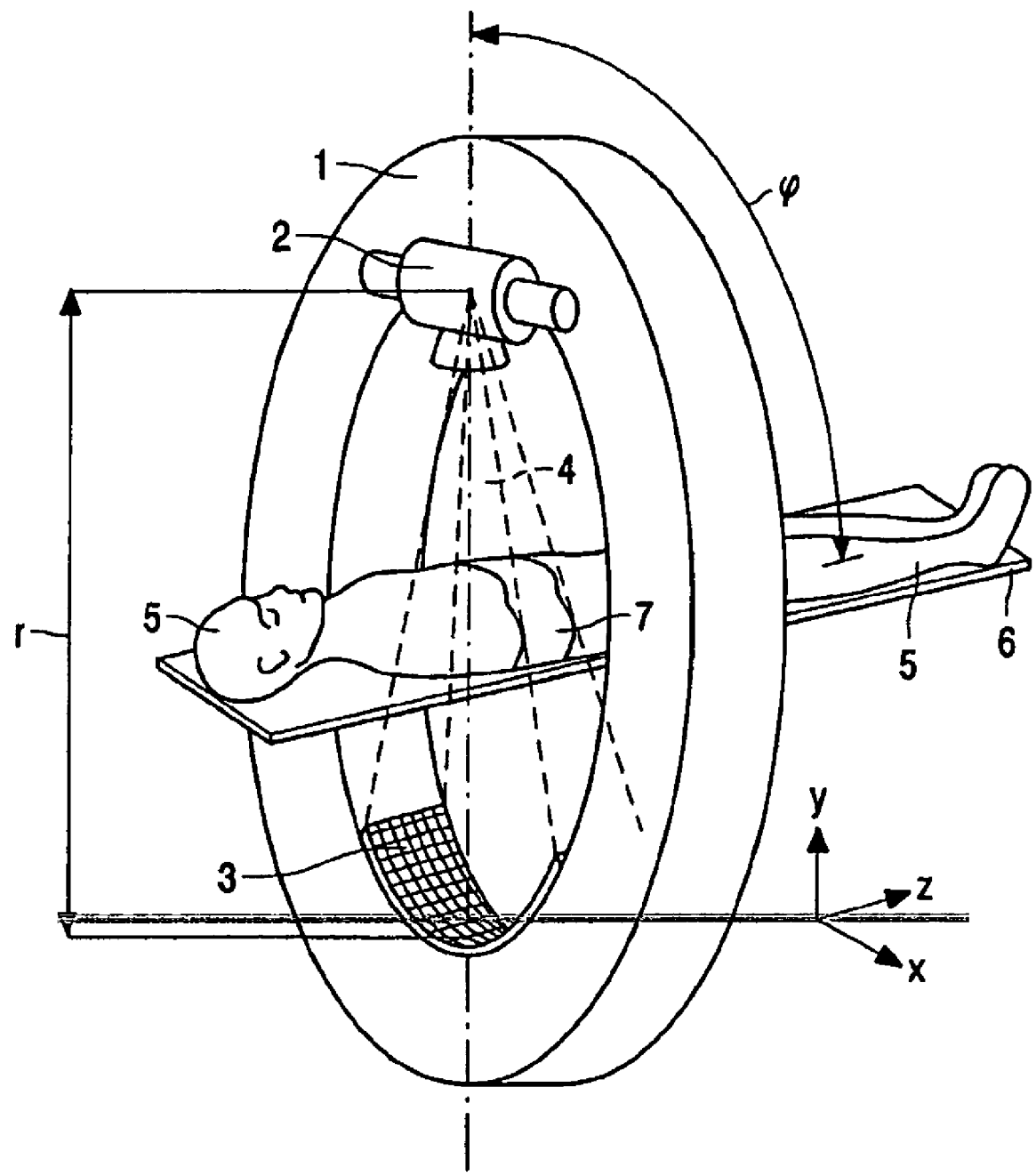

The invention pertains to an x-ray detector comprising
a conversion layer for converting x-radiation into optical radiation,
a plurality of photosensitive elements to derive electronic signals from the optical radiation,
the conversion layer containing Cesium-iodide doped with Thallium (CsI:Tl).

Such an x-ray detector is known from the paper '*Amorphous silicon pixel layers with Caesium Iodide converter for medical radiography*', by T. Jing et al. in IEEE Transactions in nuclear science 41 (1994) 903-909.

The converter layer of the known x-ray detector is formed as a CSI:Tl layer with a thickness in the range from 65 to 220 μm. Amorphous silicon pin-diodes are used as the photosensitive elements which detect scintillation light produced by x-radiation incident on the CsI:Tl layer. The Tl-concentration is kept at 0.1-0.2 mol %.

Although the conversion layer of the known x-ray detector has a high conversion efficiency, it appears that this conversion layer suffers from substantial afterglow.

An object of the invention is to provide an x-ray detector with a conversion layer having a low afterglow.

This object is achieved according to the invention by an x-ray detector wherein
the Caesium-iodide doped with Thallium is ultrapure and
the Tl-doping level is in the range of 0.25-1.00 at %.

Afterglow is the phenomenon, that upon incidence of x-rays the optical radiation generated in the conversion layer continues for some time after the incidence of x-rays has ceased. According to the present invention, the level of optical radiation continuing to be generated after the incidence of x-rays is very significantly reduced. The Tl-doping level in the range of 0.25-1.00 at % causes an intensity of the optical radiation that is higher than what is achieved for Tl doping levels lower than 0.25 at % or higher than 1.00 at %. Further it appears that the optical radiation is emitted as green light having a wavelength in the range (400-700 nm) for which the photosensitive elements have optimum sensitivity. As ultrapure CsI:Tl is used, trapping of charge carriers and increased afterglow due to mixed dopants is substantially avoided. As afterglow is substantially reduced or practically avoided, so-called after-images are avoided when a rapid succession of x-ray images is formed by successive x-irradiations. In particular, after-images are avoided when one or several low x-ray-dose fluoroscopic x-ray images are made following a high-dose x-ray exposure image. Hence, an image signal, such as an electronic video signal, that is formed from the electronic signals from the photosensitive elements is suitable to provide a rendition of the x-ray image with a high diagnostic quality in which corruptions due to after glow are absent to a high degree. Notably, doping with Indium (In) is refrained from. In the scope of the present invention ultrapure CsI:Tl means that the material is not intentionally doped with Indium. Any non-intentional doping with Indium is at a concentration of less than 500 ppm (parts per million). Good results are achieved when the non-intentional In doping level is less than 100 ppm. It appears that it is possible to achieve an ultra-low non-intentional doping level of one to a few ppm, less than 5 ppm or 10 ppm. At these ultra-low non-intentional doping levels very good results are achieved to reducing the afterglow in the time range of seconds after switching off the x-ray source by a factor of 5-10. In this respect it is noted that the Japanese patent application JP08-295878 concerns a radiation detector with a scintillator with CsI as a main constituent and Thallium and Indium as additives. Although a high Tl-doping level is employed this known radiation detector cannot add to solving the problem of afterglow since the In-doping will enhance afterglow.

It is noted that the x-ray detector according to the invention is well suited to be employed in a computed tomography system. In computed tomography an x-ray source and the x-ray detector are rotated together around the patient to be examined. At successive orientations of the x-ray beam respective attenuation profiles are received. Successive attenuation profiles may have very different dynamic ranges of their signal levels. Notably, when the patient to be examined is irradiated from successive orientations, the parts of the x-ray beam which pass past the patient without attenuation may change substantially. Consequently, portions of the detector may receive unattenuated x-rays at one orientation and may receive attenuated x-rays at a next orientation. This causes large variations in the dynamic range of the attenuation profiles received by the detector. As the x-ray detector according to the invention has a very low afterglow time, the very large dynamic range can be accommodated without corruption in subsequent lower intensity irradiations caused by high intensity irradiations.

The invention is also advantageously employed in a flat solid-state x-ray detector. Such a solid state x-ray detector comprises a plurality of sensor elements. The sensor elements are arranged in columns and rows, i.e. in a matrix arrangement. For individual columns there are provided respective read-lines. Individual sensor elements are coupled to their read-line at issue by way of a switching element, such as a thin-film transistor. Separate switching elements have an input contact, an output contact and a control contact. The input contact is connected to the sensor element, the output contact is connected to the read-line at issue. The switching element is opened or closed, i.e. made electrically insulating or conductive, on the basis of an addressing signal that is applied to the control contact. Notably, when the switching element is a thin-film transistor, its source and drain contacts function as the input and output contacts and the gate contact functions as the control contact. When an addressing signal is applied to the gate contact, the thin-film transistor at issue is made conductive and accordingly closes the switching element. For individual rows there are provided respective addressing lines. Individual switching elements of sensor elements have their control electrode connected to the addressing line at issue. Accordingly, sensor elements are read-out for entire rows, for example on a row-by-row basis by applying the addressing signal to respective addressing lines.

Individual sensor elements include a photo sensor, such as a photodiode or a phototransistor, and a conversion unit. The conversion unit converts incident x-rays into low-energy radiation, such as green light, for which the photo sensors have a good sensitivity. The low-energy radiation generates electrical charges in photo sensors. These electrical charges are read-out via the switching elements over the read-lines and subsequently an electronic image signal is formed from the read-out electrical charges.

These and other aspects of the invention will be further elaborated with reference to the embodiments defined in the dependent Claims.

Preferably, the Tl-doping is spatially homogeneous to a high degree, within a positive or negative deviation of 20% or less from the nominal value. Thus, undesired brightness variation in the rendition of the x-ray image that is represented by the electronic signals from the photosensitive elements is avoided. Further it appears that the Tl-doping level at which the intensity of the optical radiation is maximum is dependent on the thickness of the conversion layer. For a layer thickness of up to 200 µm a doping level of 0.5-1.0% is adequate, for thicker layers a doping level in the range of 0.25-0.5% is preferred. The spatially homogeneous CsI:Tl layer can be produced by co-evaporation of CsI and TlI or by disposing alternate layers of CsI and TlI, respectively, and subsequently applying a heat treatment, such as an anneal step.

These and other aspects of the invention will be elucidated with reference to the embodiments described hereinafter and with reference to the accompanying drawing therein.

Figure 2:
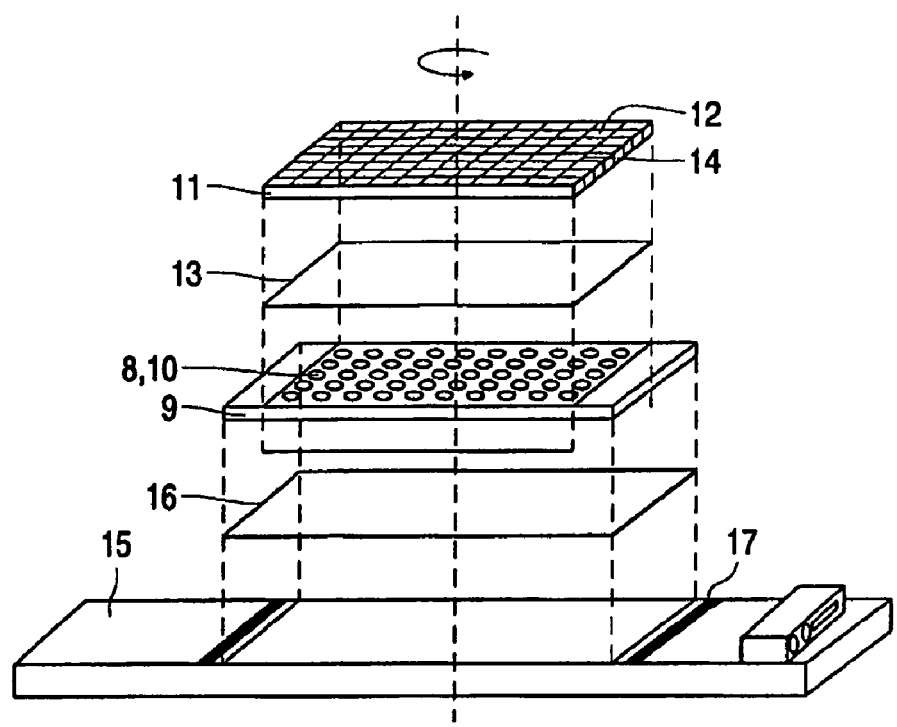
Figure 3:
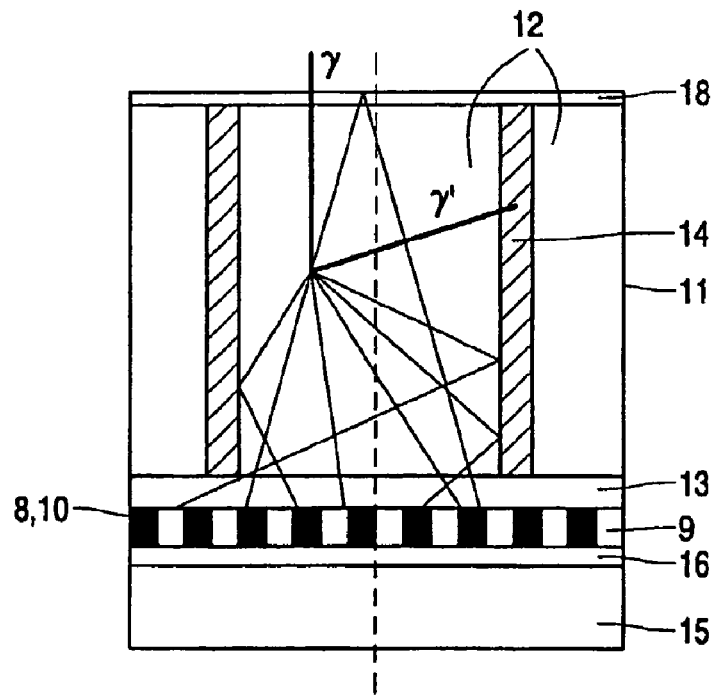
Figure 4:
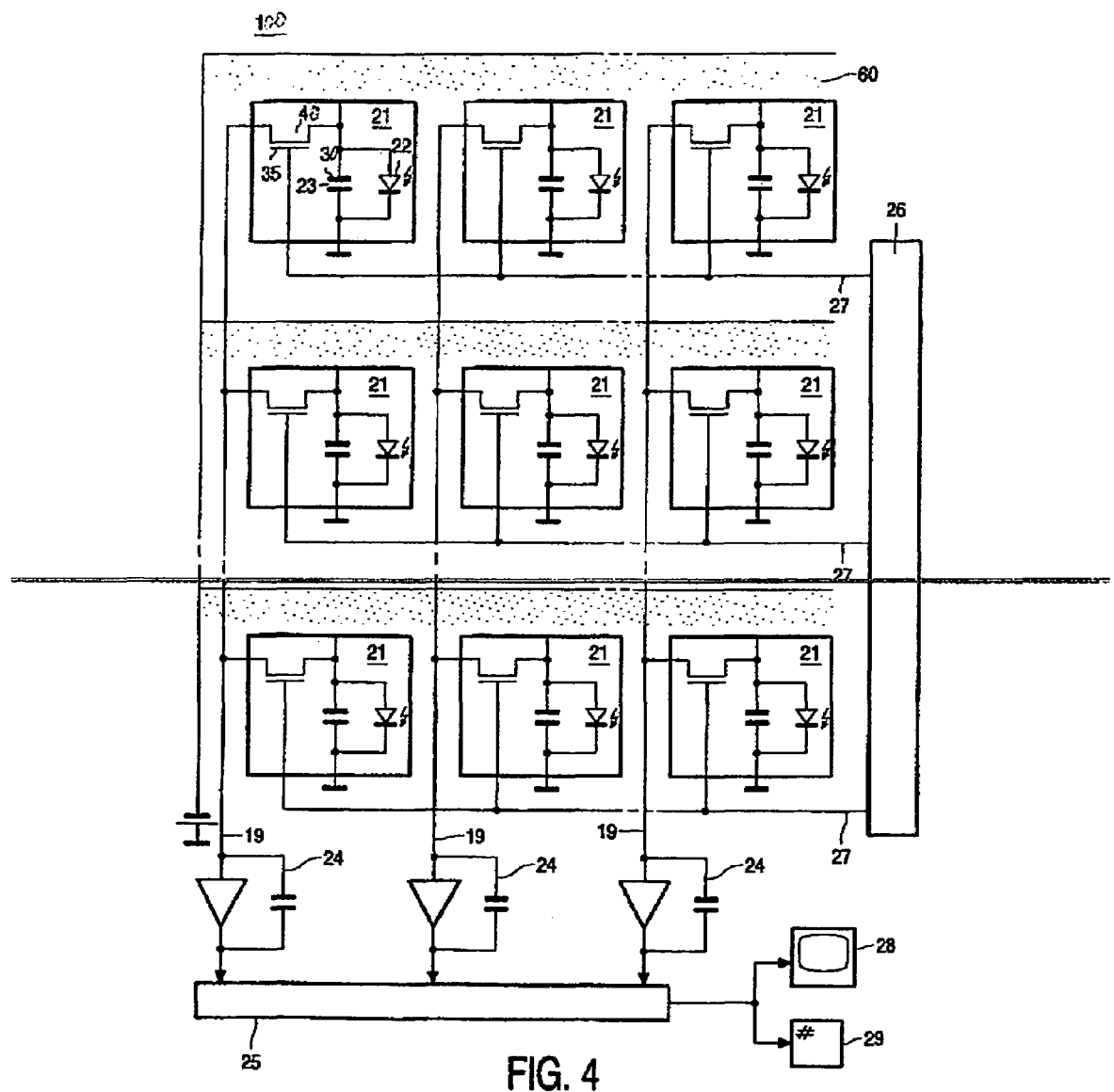
Figure 5:
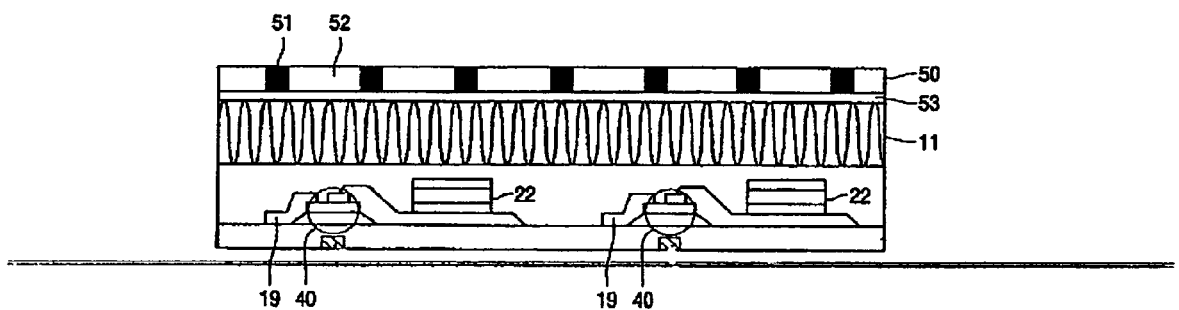
Figure 6:
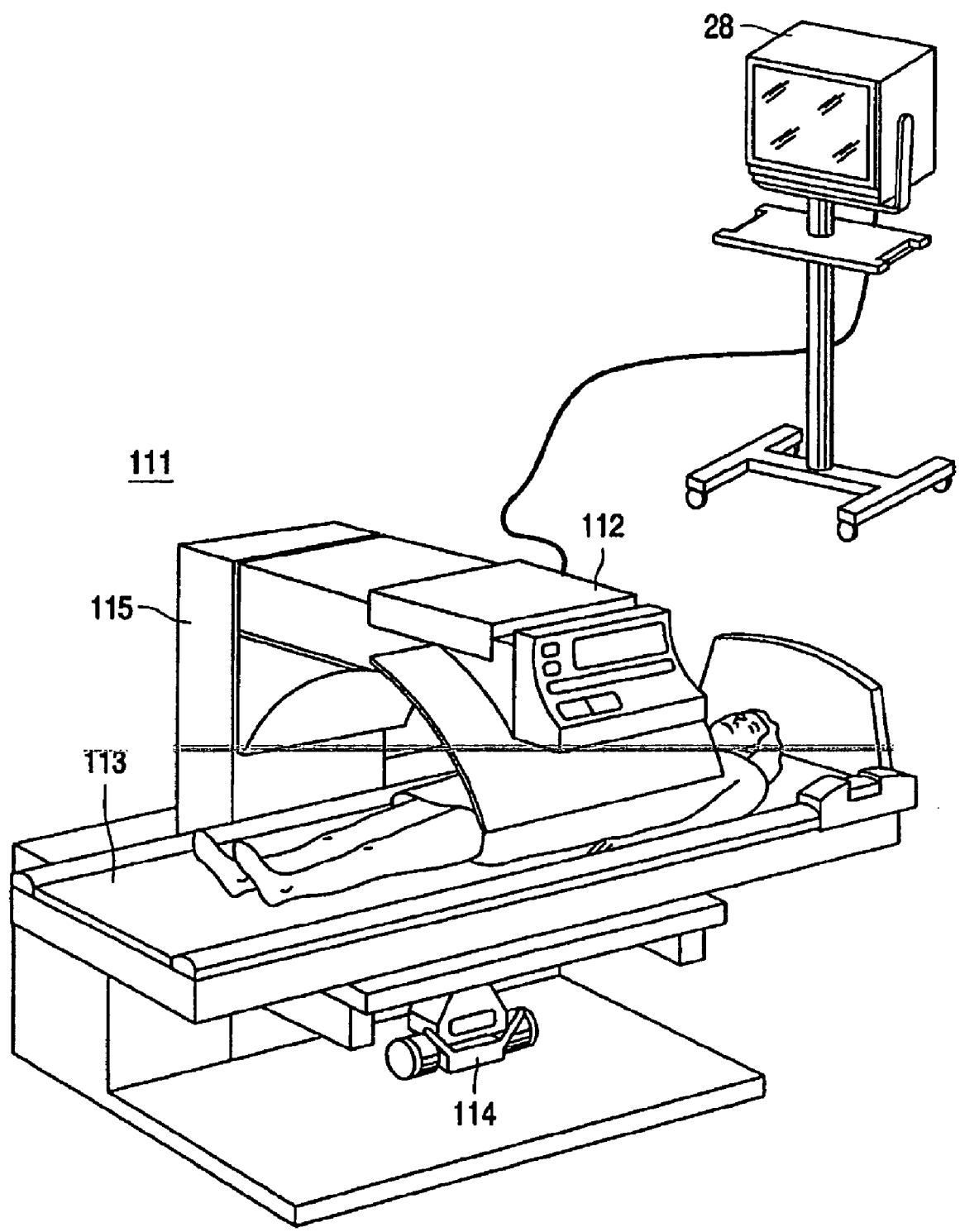

FIG. 1 shows diagrammatically a computer tomograph with a multi-line detector according to the invention;

FIG. 2 is an exploded view of a CMOS chip with a plurality of detector elements and FIG. 3 is a cross-sectional view of a plurality of detector elements in CMOS technology, FIG. 4 shows a circuit diagram of a sensor matrix incorporated in an x-ray detector of an x-ray examination apparatus according to the invention and FIG. 5 shows an embodiment of such an x-ray detector in cross-sectional view FIG. 6 shows an x-ray examination apparatus according to the invention.

FIG. 1 diagrammatically a computer tomograph 111 with a multi-line detector 3 which is formed as a detector array. The X-ray source 2 as well as the facing multi-line detector 3 are mounted in a circular portal frame or gantry 1. The X-ray source 2 emits a cone-shaped X-ray beam 4 through the patient 5 and onto the multi-line detector 3. The patient 5 to be examined is transported through the rotating gantry 1 on a table 6.

The detector array 3 is arranged at a distance r from the focus of the X-ray source 2. During a complete revolution of the gantry 1, the X-ray beam 4 irradiates the patient 5 in the gantry plane from different directions φ relative to the normal to form respective attenuation profiles which are received by the multi-line detector. A cross-sectional image 7 of the patient in the irradiated zone is reconstructed on the basis of these attenuation profiles.

The detector array 3 is composed of a plurality of detector elements which are arranged in a plurality of rows. These rows extend in parallel in the direction of the axis of rotation (z direction).

FIG. 2 shows an exploded view of the construction of a CMOS substrate according to the invention with a plurality of detector elements. A plurality of photodiodes 8 (graphically accentuated in white) and the associated amplifier elements (not shown) are realised in an integrated semiconductor technique on the same substrate. Thus, a CMOS chip 9 is realised on which the detector elements 10 (also referred to as pixels or picture elements) are arranged in the form of a matrix; for example, in this case they are arranged in six rows in the longitudinal direction and in nine columns in the transverse direction. A complete detector array 3 customarily consists of a plurality of consecutively arranged chips 9.

Over each CMOS chip 9 there is arranged the conversion layer formed by a scintillator 11 which is as large as the CMOS chip 9. The scintillator 11 is formed by Tl-doped ultrapure CsI, having a Tl doping level in the range of 0.25-1.00 at %. The scintillator 11 is connected to the CMOS chip so as to be exactly positioned with respect thereto by means of a thin layer of an optical adhesive 13. Absorber layers 14 which will be described in detail hereinafter are provided between the individual crystals 12 of the scintillator.

The CMOS chips 9 are mounted on a printed circuit board or PCB 15 by means of an adhesive layer 16. The electrical connections from the CMOS chip 9 to the PCB 15 are formed by leads to the bond pads 17.

FIG. 3 is a cross-sectional view of a plurality of detector elements in CMOS technology. FIG. 3 partly shows the cross-section of the CMOS chip 9 with the scintillator 11. This Figure shows how the photodiodes 8 are provided on the substrate of the CMOS chip 9. Over the scintillator 11 there is provided a reflection layer 18 which is not shown in the drawing. The absorber layers 14 can be seen in the vertical direction between the individual crystals 12.

When x-radiation is incident on the detector, the X-ray quanta (γ) are absorbed in the scintillator 11 and converted into visible light (diagrammatically represented by black strokes). These photons are reflected partly on the absorber layers 14 or on the reflecting layer 18 provided on the scintillator and are subsequently absorbed in the CMOS chip 9 bonded to the scintillator 11. Secondary X-ray quanta (γ') are absorbed in the absorber layers 14 in order to avoid cross-talk between neighbouring detector elements.

The photons absorbed in the photodiodes 8 situated underneath the scintillator crystals 12 generate electron-hole pairs. The charge thus generated is collected element-wise in the amplifier elements (not shown) which are arranged directly underneath the absorber layers 14 in order to protect the sensitive circuits from the X-rays.

FIG. 4 shows a circuit diagram of a sensor matrix 100 incorporated in an x-ray detector of an x-ray examination apparatus according to the invention. Sensor matrix 100 incorporates a plurality of sensor elements arranged in a matrix. For each pixel in the x-ray image there is provided a sensor element 21 which comprises a photo-sensor element 22, a collecting capacitance 23 and a switching element 40. Electric charges are derived from incident x-rays by the photo-sensor element 22, which electric charges are collected by the collection capacitance 23. The collecting electrodes 30 form part of respective collecting capacitances 23. For each column of sensor elements there is provided a respective read-line 19 and each collecting capacitance 23 is coupled to its respective read-line 19 by way of its switching element 40. The photo-sensor elements, preferably in the form of pin-photodiodes, and the thin-film transistors, read-lines and addressing lines are provided on a substrate 60. For example a glass plate is used as the substrate 60. Although as an example FIG. 1 shows only 3×3 sensor elements, in a practical embodiment a much larger number of sensor elements, say 2000×2000, is employed.

In order to read-out the collected electric charges the relevant switching elements 40 are closed so as to pass electric charges from the collecting capacitances down respective read-lines. Separate read-lines 19 are coupled to respective highly sensitive output amplifiers 24 of which the output signals are supplied to a multiplex circuit 25. The electronic image signal is composed from the output signals by the multiplex circuit 25. The switching elements 40 are controlled by means of a mw-driver circuit 26 which is coupled to the switching elements for each row by means of addressing lines 27. The switching elements 40 are preferably formed as thin-film transistors (TFT) of which the drain contact is connected to a relevant read-line, the source contact is connected to the relevant collecting electrode and the gate contact is coupled to the relevant addressing line. The multiplex circuit supplies the electronic image signal e.g. to a monitor 28 on which the image information of the x-ray image is then displayed or the electronic image signal may be supplied to an image processor 29 for further processing.

FIG. 5 shows an embodiment of such an x-ray detector in cross-sectional view. The x-ray sensor matrix also comprises the conversion layer 11 in the form of a scintillation layer of e.g. CsI:Tl, which is disposed over the photodiodes. Such a scintillation layer converts incident x-rays into green light for which the photodiodes are substantially sensitive. Preferably, the CsI:Tl is deposited in the form of columnar crystals, groups of which effectively form light-guides. Such groups of columnar crystals are separated by cracks that are distributed preferably at about 200-400 cracks per centimeter. Typically the thickness of the CsI:Tl layer is in the range 300-1000 μm.

On the side from which x-rays are incident on the conversion layer 11 there is provided a scatter grid 50. The scatter grid comprises a plurality of x-ray transparent channels 52 which are alternated by x-ray opaque portions 51. The x-ray transparent channels 52 are substantially directed towards the x-ray source, so that scattered x-rays are substantially intercepted. Between the scatter grid 50 and the conversion layer 11 the diffusive reflector layer 53, notably a titanium-oxide layer is disposed. When the diffusive reflector layer is employed, the CsI:Tl conversion layer 11 can have a thickness less than 500 μm.

FIG. 6 shows an x-ray examination apparatus according to the invention.

The x-ray examination apparatus comprises a patient table 113 on which a patient who is to be examined can be positioned. The x-ray source 114 is provided under the patient table. The x-ray detector 112 is mounted on a carrier 115 so that the x-ray detector faces the x-ray source. In order to produce an x-ray image, the patient is irradiated with an x-ray beam which is emitted by the x-ray source. Owing to local differences of the x-ray absorption in the patient an x-ray shadow image is formed on the x-ray detector. By the sensor matrix illustrated in FIG. 4, which is incorporated in the x-detector 112 of FIG. 6. the x-ray image is converted into an electronic image signal. The electronic image signal is supplied to the monitor 28 on which the image information of the x-ray image is displayed.

The invention claimed is:

1. A method of forming an x-ray detector, the method comprising the steps of:
   providing a plurality of photosensitive elements to generate electronic signals from optical radiation;
   disposing alternate layers of CsI and TlI to form a conversion layer that is spatially homogeneous, the conversion layer being configured to convert x-rays into optical radiation in the range of about 400 to 700 nanometers, the conversion layer comprising cesium iodide doped with TlI, which includes from 0.25% to 1% of thallium and from one to 100 parts per million of indium; and
   connecting the conversion layer to the plurality of photosensitive elements using an optical adhesive that is in contact with a surface of each of the conversion layer and the plurality of photosensitive elements.

2. The method of claim 1, further comprising forming the conversion layer with a thickness less than about 500 μm.

3. The method of claim 2, further comprising providing a diffusive reflector layer adjacent to the conversion layer on a side opposite to the optical adhesive.

4. The method of claim 3, further comprising forming a scatter grid adjacent to the diffusive reflector layer on a side opposite to the conversion layer, wherein the scatter grid has alternating x-ray transparent and x-ray opaque channels.

5. The method of claim 1, wherein the conversion layer of the x-ray detector has from one to ten parts per million of indium.

6. The method of claim 1, wherein the conversion layer of the x-ray detector has from one to five parts per million of indium.

7. The method of claim 1, wherein the conversion layer of the x-ray detector has from one to a few parts per million of indium.

8. The method of claim 1, further comprising applying an annealing step to the conversion layer after disposing the alternate layers of CsI and TlI.

9. The method of claim 1, further comprising forming the conversion layer as columnar crystals separated by cracks that are distributed at about 200 to 400 cracks per centimeter.

10. An x-ray detector comprising:
    a plurality of photosensitive elements to generate electronic signals from optical radiation; and
    a conversion layer to convert x-rays into the optical radiation in the range of about 400 to 700 nanometers, the conversion layer comprising cesium iodide doped with TlI with from 0.25% to 1% of thallium and from one to 100 parts per million of indium, the conversion layer being connected to the plurality of photosensitive elements by an optical adhesive that is in contact with a surface of each of the conversion layer and the plurality of photosensitive elements.

11. The x-ray detector of claim 10, further comprising a diffusive reflector layer adjacent to the conversion layer and on a side of the conversion layer opposite to the optical adhesive, wherein the conversion layer is less than 500 μm thick.

12. The x-ray detector of claim 11, wherein the conversion layer is formed by columnar crystals separated by cracks that are distributed at about 200 to 400 cracks per centimeter.

13. The x-ray detector of claim 12, wherein the reflector layer is titanium oxide.

14. The x-ray detector of claim 11, further comprising a scatter grid comprising alternating x-ray transparent and x-ray opaque channels, wherein the scatter grid is adjacent to the diffusive reflector layer on a side opposite to the conversion layer.

15. The x-ray detector of claim 10, wherein the conversion layer of the x-ray detector has from one to ten parts per million of indium.

16. The x-ray detector of claim 10, wherein the conversion layer of the x-ray detector has from one to five per million of indium.

17. The x-ray detector of claim 10, wherein the conversion layer of the x-ray detector has from one to a few parts per million of indium.

18. A method for forming an x-ray detector, the method comprising the steps of:
    forming a matrix of photosensitive elements to generate electronic signals from optical radiation;
    forming a conversion layer by co-evaporating CsI and TlI, the conversion layer being spatially homogeneous and configured to convert x-rays into optical radiation in the range of about 400 to 700 nanometers, the conversion layer comprising cesium iodide doped with TlI with from 0.25% to 1% of thallium and from one to 100 parts per million of indium; and
    connecting the conversion layer to the matrix of photosensitive elements.

19. The method of claim 18, wherein the conversion layer is connected to the plurality of photosensitive elements using an optical adhesive that is in direct contact with the conversion layer and the matrix of photosensitive elements.

20. The method of claim 18, further comprising providing a diffusive reflector layer adjacent to the conversion layer on a side opposite to the plurality of photosensitive elements.

21. The method of claim 20, further comprising forming a scatter grid adjacent to the diffusive reflector layer on a side opposite to the conversion layer, wherein the scatter grid has alternating x-ray transparent and x-ray opaque channels.

* * * * *